United States Patent [19]

Knapton et al.

[11] 4,375,426

[45] Mar. 1, 1983

[54] CATALYTIC FIBRE PACKS FOR AMMONIA OXIDATION

[75] Inventors: Arthur G. Knapton, Henley on Thames; Gordon L. Selman, Near Reading, both of England

[73] Assignee: Johnson, Matthey & Co., Limited, London, England

[21] Appl. No.: 197,683

[22] Filed: Oct. 16, 1980

[51] Int. Cl.$^3$ .................. B01J 23/42; B01J 23/46; B01J 35/06
[52] U.S. Cl. .................................. 252/472; 252/477 R
[58] Field of Search .................. 252/472, 477 R; 264/164, 165; 423/392; 428/594, 605, 608, 670

[56] References Cited

U.S. PATENT DOCUMENTS

| | | | |
|---|---|---|---|
| 3,406,025 | 10/1968 | Hamling | 428/605 X |
| 3,769,240 | 10/1973 | Lew et al. | 252/477 R |
| 3,812,901 | 5/1974 | Stewart et al. | 264/165 X |
| 3,838,185 | 9/1974 | Maringer et al. | 264/165 X |
| 3,904,344 | 9/1975 | Maringer et al. | 264/165 X |
| 3,931,051 | 1/1976 | Dubler | 252/477 R |
| 4,069,171 | 1/1978 | Lemkey et al. | 252/477 R |

FOREIGN PATENT DOCUMENTS 889583 2/1962 United Kingdom .

*Primary Examiner*—W. J. Shine
*Attorney, Agent, or Firm*—Cushman, Darby & Cushman

[57] ABSTRACT

This invention is concerned with the application of fibrous products from platinum group metal or platinum group metal alloys to the oxidation of ammonia in the manufacture, for example, of nitric acid and to the production of hydrogen cyanide in the Andrassow Process. In particular, the invention relates to a catalyst assembly including an agglomeration or assemblage of randomly oriented fibres made from a platinum group metal or an alloy containing at least one platinum group metal, gold or silver. The fibres used in the catalyst assembly are preferably produced by melt extraction or melt spinning processes.

12 Claims, 6 Drawing Figures

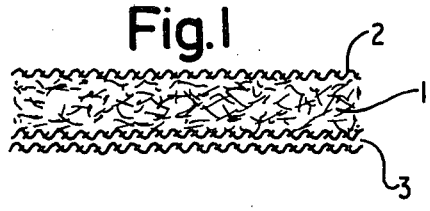
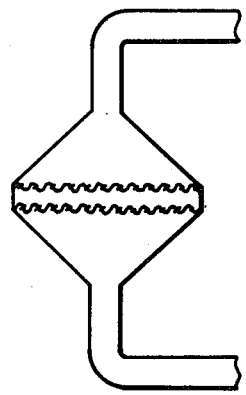
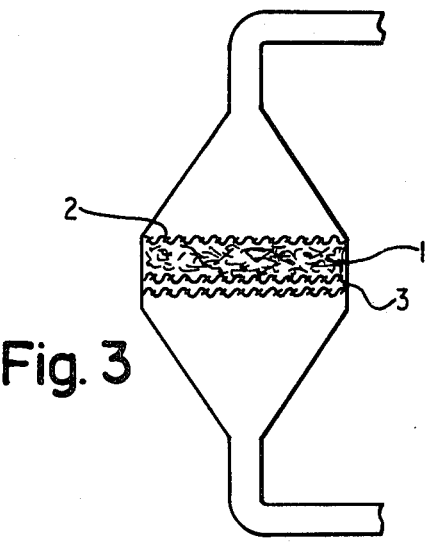

CATALYTIC FIBRE PACKS FOR AMMONIA OXIDATION

This invention is concerned with the application of fibrous products from platinum group metal or platinum group metal alloys to the oxidation of ammonia in the manufacture, for example, of nitric acid and to the production of hydrogen cyanide in the Andrassow Process.

In the usual commercial production of nitric acid, a mixture of ammonia and air in suitable proportions is passed through a gauze or multiplicity of gauzes which act as catalyst for the oxidative conversion of the ammonia to NO (nitric oxide). The effluent gas from the gauze is cooled and further treated with additional air and water to produce nitric acid. The material used for the manufacture of the gauzes is usually platinum or a platinum based alloy. A gauze made from platinum with the addition of 10% by weight of rhodium is the gauze most frequently used. Typically, the gauze would be woven from wire of 0.003 inch diameter with 80 meshes to the linear inch. The production of the gauze involves fabrication of large platinum alloy ingots to wire, with many working and intermediate annealing stages, followed by the technially tedious and expensive weaving of the wire into gauzes. The present invention offers an improved catalyst and a method for the production of a catalyst pad. The performance of the pad is, in certain respects, superior to the corresponding loading of alloy in gauze form. The pad according to the present invention exhibits more rapid light-off, better conversion efficiency and an increased life compared with a conventional gauze pad.

According to the present invention, a catalyst assembly suitable for use in the oxidation of ammonia includes an agglomeration or assemblage of randomly oriented fibres made from a platinum group metal (that is, platinum, palladium, ruthenium, iridium, rhodium and osmium) or an alloy containing at least one platinum group metal, gold or silver. The fibres are preferably relatively short filaments (in this context, by short we mean short when compared with the length of the wires used in the construction of conventional catalyst gauzes) which may be of generally circular or non-circular, for example, rectangular (i.e. of ribbon form) and "D" or semi-circular cross section. Where the fibres are of "D" cross-sectional shape, the major dimension falls within the range 0.004–0.006 inch and the minimum dimension falls within the range 0.002 to 0.005 inch. Preferably, the cross-sectional shape of the fibres is non-circular.

In the commercial production of nitric acid the mixture of air and ammonia may be passed through the catalyst at pressures in excess of 100 p.s.i. and at temperatures of between 650° C. and 1000° C. Where a catalyst according to the present invention is used at such temperatures and pressures, it is preferably supported, at least downstream (when considered in the direction of flow of the reactants), by one or more conventional gauzes which may be made from a platinum group metal, an alloy containing at least one platinum group metal or made from Kanthal (Registered Trade Mark), the latter being an iron/chromium/aluminum alloy as shown in U.S. Pat. No. 3,881,877. Conveniently, the agglomeration or assemblage of fibres is sandwiched between one or more layers of conventional gauze as mentioned above. According to a practical embodiment of the invention in the manufacture of nitric acid, the agglomerate or assemblage of fibres is disposed within a catalyst zone comprising one or more gauzes supporting the agglomeration or assemblage from below and one or more containing gauzes disposed above the agglomeration or assemblage, the said gauzes being made from a platinum group metal, Kanthal or an alloy containing at least one platinum group metal. Preferably, the fibres of the agglomeration and the gauzes are made from platinum, platinum-rhodium or a platinum-rhodium-palladium alloy. If desired, the fibres in the agglomerate may be welded, e.g. by laser techniques in order to produce a self supporting unit. Generally speaking, however, in use the fibres are bonded together by sintering.

BRIEF DESCRIPTION OF THE DRAWINGS

FIGS. 1, 2 and 3 illustrate the catalyst assembly of the invention and its use; while

The invention is illustrated by way of example in FIG. 1 which shows an agglomeration of fibres sandwiched between gauzes and FIGS. 2 and 3 which show a conventional gauze installation and an installation according to the invention respectively. In this example, the principal active catalytic component is an agglomeration (1) of fibres made from a platinum alloy. The thickness of this pad is selected to be appropriate to the operating conditions of the nitric acid plant in which it is to be used. For a high pressure plant, operating with an ammonia loading of 100 tones $NH_3/m^2$/day at 110 psig, the agglomerate would contain a mass of 17.7 kg per square meter of agglomerate or pad area of 10% rhodium-platinum alloy fibres, the fibre being of average cross section corresponding to 0.003 inch diameter wire. The pad would be compressed to a thickness of 0.180 inch. The agglomerate of fibres may be compressed to a density such that the agglomeration contains between 10 and 30 kg per square meter of agglomerate and is, preferably, compressed to 15–20 kg per square meter of agglomerate surface. In FIG. 1, the loss of any loose strands of fibre in the agglomerate is prevented by use of an upper gauze (2), or rhodium platinum alloy supported on a further gauze (3) which may either be of base metal or platinum alloy. The gauze and fibre agglomerate assembly described above would usually, in practice, be further supported on a coarse oxidation resistant base metal gauze or rods for use in the ammonia oxidation burner.

Figure 4:
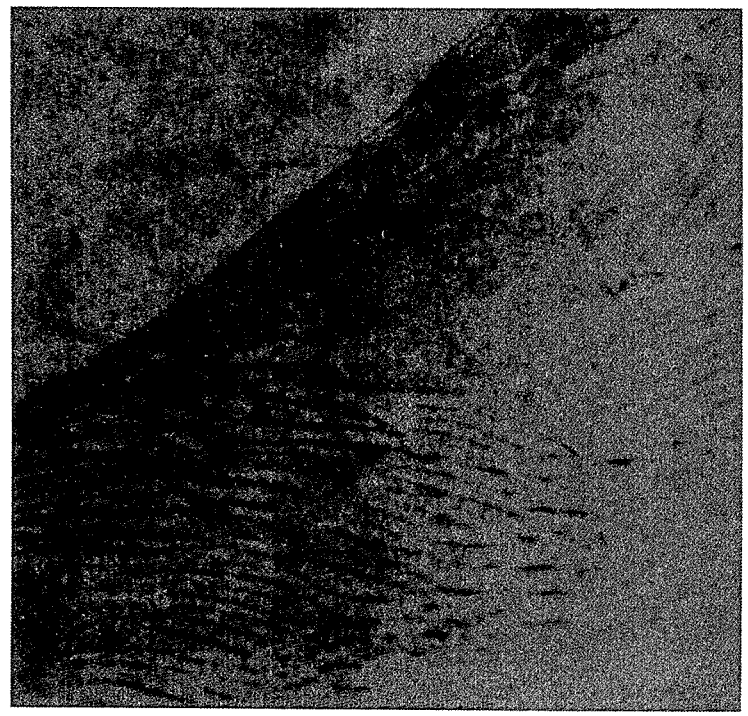
FIGS. 4, 5 and 6 show various surfaces of the assembly after use.

The arrangement given in the above example is not intended to be exclusive, and various combinations of gauze layers (2) or (3) with fibrous product agglomerates therebetween of various thicknesses can obviously be designed for various applications or plant parameters depending on prevailing circumstances. Indeed by methods to be described later, these gauzes may be dispensed with entirely, especially if the fibres of the pad are bonded together e.g. laser welding, to give a strong self supporting assembly. In other words, the conventional pack of gauzes in an ammonia oxidation plant may be with advantage substituted either partially or completely with the random fibre arrangement of this invention. Such substitution can be as a single layer, as shown in FIG. 1, or various multiple sandwich arrangements are possible.

A number of methods for the production of appropriate fibres from an alloy containing at least one platinum-group metal, gold or silver may be used in the operation of the present invention as outlined below. Melt spinning in which fine metal jets or streams are rapidly solidified on a rotating metal wheel, or the related process melt extraction may be used in the production of appropriate platinum alloy fibre. The fibre produced by these methods is preferred in this invention and may be either in substantially continuous lengths, which is subsequently cut to required lengths, or may be prepared in shorter discrete lengths of staple fibre. The length of fibre for use in the fibre agglomerates which form part of the catalyst assemblies according to the present invention is conveniently within the range ½ to 4 inches and preferably within the range ½ to 2 inches. Such fibres can be produced by melt extraction process (sometimes referred to as "melt spun" or "melt extraction" process) by the apparatus described in U.S. Pat. No. 3,904,344. Alternatively, apparatus for producing fibres on filaments is described in U.S. Pat. Nos. 3,838,185 and 3,812,901.

In the melt spin process, a stream of molten metal or alloy is either allowed to solidify in free flight or is caused to solidify by contact with a so-called "chillblock". This is a cooled body or a body of high thermal capacity or both and is generally in the form of a rotating wheel, disc or dish or a moving belt. The stream of molten metal impinges on the body and is thrown off or removed therefrom as a continuous or discontinuous filament depending upon such parameters as the temperature and speed of the stream of molten metal or alloy as it impinges on the chill block and the surface speed of the chill block at the point of impingement. For example, if the temperature of the impinging stream and the surface speed of the chill block are held constant, any increase in the speed of impingement on the chill block will tend to cause the metal or alloy to pile up on the block so that the filament leaving it will increase in thickness. On the other hand, if the speed of impingement is progressively reduced, the tendency of the metal or alloy to pile up and the thickness of the resulting filament is also progressively reduced until the point is reached where the thinnest continuous filament possible at the particular temperature of the metal or alloy will be produced. Any further reduction in the speed of impingement will then result in the production of discontinuous filaments.

In the melt extraction or melt-drag process, molten metal or alloy first forms a meniscus between a nozzle at the end of a feed tube from a crucible containing a static head of the molten metal or alloy and the curved surface of a cooled rotating body such as a drum. The meniscus is partially solidified by contact with the body surface which drags away the solidifying metal or alloy to form a continuous filament. Solidification is completed as the body rotates and the solidified filament, which may be in the form of a fibre, a filament or a strip, is removed from the body surface before it has executed a complete revolution and is then coiled. Crimping of fibre by passing through toothed rollers is advantageous in yielding a material which knits or intertwines more readily into a relatively rigid catalyst pad, and such crimping may be similarly advantageous to fibre produced by other processes.

Various methods may be employed for forming the fibre into suitable pads. For example, the alloy fibres may be allowed to settle from a viscous liquid medium, the liquid being extracted via a porous substrate in a manner similar to paper-making processes. Alternatively, the fibres may be distributed manually by hand over the required surface area, followed by lightly compressing into a pad of suitable thickness for the ammonia oxidation process. Alternatively, the fibres may be bonded into a pad with a heat decomposable adhesive or binder which oxidises away in the early stages of a run using the new pad. By this stage the fibres have sintered together to form an agglomerate which does not disintegrate. Suitable adhesives which may be used for this purpose are ethylcellulose polymethylmethacrylate and polybutylmethacrylate. To allow for easier handling the resulting pad may be converted into a more rigid assembly by stitching with platinum alloy wire. Stapling is a further possible method for achieving the same object. Spot welding at regular intervals or seam welding is also a successful method for partially binding the fibres together during the assembly stage.

It is common practice in treating gauzes prior to installation in ammonia oxidation burner to clean and partially activate the material by a combination of pickling in acid, degreasing, and hydrogen flaming treatments. Similar treatments may be applied with advantage to fibre pads. With fibre produced by melt extraction or melt spinning higher than normal catalytic activities may be achieved in the absence of such treatments.

EXAMPLE 1

A pack containing four Pt-10%Rh leading gauzes, melt extracted alloy fibre of the same composition equivalent to twenty gauzes and a single support gauze also of Pt-10%Rh, was operated in a laboratory pilot plant under the following conditions which closely simulate a typical high pressure nitric acid manufacturing unit.

Pressure = 100 psig
Ammonia loading = 110 tons/m$^2$/day
Ammonia Content = 10.1%
Inlet temp. = 250° C.

The exposed area of gauze in this experimental unit was circular and 1" diameter. The pad was cleaned by heating for 2 minutes in a hydrogen flame before use.

Under the above conditions it was found that maximum conversion efficiency of ammonia to NO was achieved much more rapidly than when gauzes alone are used, the experimental pad attaining this stage within an hour compared with 2 to 3 days for gauze. The observed conversion efficiency was 96.5%, also above that obtained, with the corresponding platinum loading in gauze form (95%).

EXAMPLE 2

A similar pad configuration made from melt extracted fibres was exposed in a small high-pressure commercial nitric acid plant manufacturing approximately 45 tons HNO$_3$ per day.

An existing industrial plant for ammonia oxidation normally operates with 25 10% Rh/Pt gauzes woven from 0.076 mm diameter wire at 1024 B.S. mesh size. In this example 20 of the gauzes were replaced with an equal weight of melt spun 10% Rh/Pt fibre in 2 inch lengths retained between four leading gauzes, one trailing gauze, two Kanthal D support gauzes and one coarse mesh Kanthal support gauze and one coarse mesh Kanthal support gauze.

Two packs of this construction were made under normal plant conditions as run numbers 167 and 170 and details of run numbers 168, 169 and 171 are included for comparison purposes.

| Run No. | Pack type | Campaign (days) | Acid made in tonnes of 100% acid | Wt. loss mg/ tonnes of acid | Original pack weight |
|---|---|---|---|---|---|
| 167 | Fibre | 24 | 1075 | 291 | 1939.4 |
| 168 | Gauze | 19 | 857 | 330 | 2001 |
| 169 | Gauze | 27 | 1202 | 316 | 1968 |
| 170 | Fibre | 21 | 877.7 | 281 | 1940.5 |
| 171 | Gauze | 34 | 1539 | 349 | 2057 |

Inlet temp. 220° C.
Pack temp. 920° C.

Run 167-Light off was much easier than normal with a more rapid rise to operating efficiency. Thereafter, the pack ran smoothly and well. The run was terminated after 24 days for convenience, not loss of conversion efficiency. Detailed examination of the pack after use showed the normal crystallite growth pattern on the leading gauzes and front face of the fibre pad. The rear of the fibre pad remained bright as did the rear 10% Rh/Pt gauze although some limited crystallite growth had occurred. The fibre pad itself was mechanically sound, had sintered to some extent but showed no signs of breaking up. No areas of channelling were detected and the pad appeared free of dust blockages.

Figure 5:
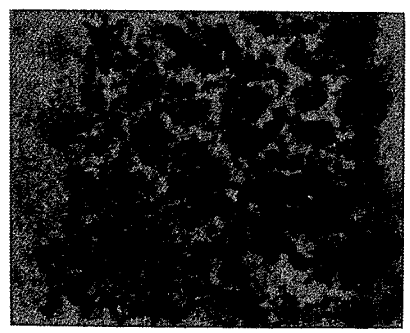
Figure 6:
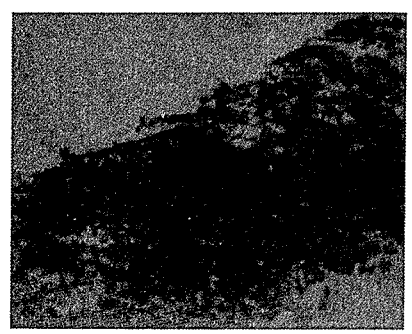

FIGS. 4, 5 and 6 are reproductions of photographs (each at 500 magnification) showing respectively, the fibres of the agglomerate after 10 hours usage and the irregular surface configuration of the fibres; the leading face of the agglomerate and the rear face of the agglomerate indicating the crystallite growth pattern after 24 days.

Run 170-Easy light off and rapid rise to full efficiency. Prior to shut down on day 12 to replace a blocked inlet filter the efficiency was maintained. After filter change a fall in conversion level was found to be associated with catalyst poisoning by foreign matter.

Weight losses for both runs were close 291 and 281 mgm/tonne acid and were lower than with the conventional gauzes.

EXAMPLE 3

Surface area measurements were carried out on 10% Rh/Pt wire drawn to 0.076 mm diameter commonly used for gauze manufacture; 10% Rh/Pt melt spun fibre and 5% Rh 5% Pd 90% Pt fibre.

10% Rh/Pt wire 6.9 sq m per g.
10% Rh/Pt fibre 8.3 sq m per g.
5% Rh 5% Pd/Pt fibre 13.3 sq m per g.

EXAMPLES 4-15

In a pilot plant rig simulation of an industrial ammonia oxidation plant a number of combinations of different alloys of the platinum group metals and fibre and gauze were tested for conversion efficiency. Except in Example 5 the same weight of metal equivalent to 47 conventional gauzes was used.

| Example Pack | No. of conventional gauzes equivalent to | Alloy used | Conversion Efficiency |
|---|---|---|---|
| 4 47 conventional gauze 0.076 mm wire | 47 | 10% Rh/Pt | 94.7 |
| 5 fibre packed at ⅓ gauze density | 47 | 10% Rh/Pt | 91.1 |
| 6 fibre packed at ⅔ gauze density | 47 | 10% Rh/Pt | 91.6 |
| 7 fibre packed at full gauze density | 47 | 10% Rh/Pt | 97.0 |
| 8 fibre packed at full gauze density | 16 | 10% Rh/Pt | 93.3 |
| 9 fibre packed at full density | 47 | 5 Pd/5Rh/Pt | 96.3 |
| 10 fibre packed at ⅔ gauze density | 47 | 5 Pd/5 Rh/Pt | 89.4 |
| 11 50% fibre + 50% wire | 47 | 10% Rh/Pt fibre Pd wire | 87.8* |
| 12 wire gauze | 47 | Pd | 82.4 |
| 13 100% fibre + catchment gauze | 47 | 10% Rh/Pd fibre Au/Pd wire | 87.96 |
| 14 50% fibre 50% wire | 47 | 10% Rh/Pt fibre Kanthal D wire | ** |
| 15 50% fibre 50% wire | 47 | 10% Rh/Pt fibre Kanthal D wire | 91.15 |

*signs of localised melting
**melted

The fibre agglomerate according to the invention have been found to give a performance at least equivalent to and generally better than that of conventional gauze packs in the manufacture of nitric acid. Further, use of the agglomerates showed considerable metal saving compared with the use of standard gauze packs. In addition the use of fibres overcomes the tedious and expensive process of fine wire drawing and weaving.

We claim:

1. A catalyst assembly including an agglomeration or assemblage of randomly oriented melt extracted or melt spun fibres made from a platinum group metal or an alloy containing at least one platinum group metal and supported on at least one metal gauze.

2. A catalyst assembly according to claim 1 wherein the fibres are of relatively short length.

3. A catalyst assembly according to claim 1 wherein the fibres are of generally circular or non-circular cross section and bearing an irregular surface.

4. A catalyst assembly according to claim 1 wherein the length of the fibres falls within the range of ½ to 4 inches.

5. A catalyst assembly according to claim 4 wherein the length of the fibres falls within the range of ½ to 2 inches.

6. A catalyst assembly according to claim 5 wherein the fibres are of "D"-cross-sectional shape having the major dimension thereof falling within the range 0.004 to 0.006 inch and having the minor dimension therof falling within the range 0.002 to 0.005 inch.

7. A catalyst assembly according to claim 1 wherein the fibres are crimped.

8. A catalyst assembly according to claim 1 wherein the agglomeration of fibres is compressed to a density such that the agglomeration contains between 10 and 30 kg per square meter of agglomerate.

9. A catalyst assembly according to claim 8 wherein the said density falls within the range of 15 to 20 kg per square meter of agglomerate.

10. A catalyst assembly according to claim 1 wherein the agglomeration of fibres is supported on at least one gauze made from a platinum group metal or alloy thereof or an oxidation-resistant base metal.

11. A catalyst assembly according to claim 1 wherein the agglomeration of fibres is sandwiched between layers comprising one or more gauzes made from a platinum group metal, or alloy thereof or an oxidation-resistant base metal.

12. A catalyst assembly according to claim 10 wherein the fibres are made from a 10% Rh/Pt alloy.

* * * * *

UNITED STATES PATENT AND TRADEMARK OFFICE
CERTIFICATE OF CORRECTION

PATENT NO. : 4,375,426

DATED : March 1, 1983

INVENTOR(S) : Arthur G. Knapton and Gordon L. Selman

It is certified that error appears in the above-identified patent and that said Letters Patent are hereby corrected as shown below:

On title page of patent, add:

-- [30]  Foreign Application Priority Data

October 18, 1979 [GB] United Kingdom.....7936209 --

Signed and Sealed this

Sixteenth Day of August 1983

[SEAL]

Attest:

GERALD J. MOSSINGHOFF

Attesting Officer　　Commissioner of Patents and Trademarks

UNITED STATES PATENT AND TRADEMARK OFFICE
CERTIFICATE OF CORRECTION

PATENT NO. : 4,375,426
DATED : March 1, 1983
INVENTOR(S) : Arthur G. Knapton and Gordon L. Selman It is certified that error appears in the above-identified patent and that said Letters Patent is hereby corrected as shown below:

Column 1, line 25, correct spelling of "technically"
line 48, change "minimum" to --minor--

Column 3, line 17, change "on" to --or--

Column 4, line 18, between "in" and "ammonia" insert --an--
line 59, correct spelling of "gauzes"
lines 63-64, delete second occurrence of "and one coarse mesh Kanthal support gauze"

Column 5, line 46, between "Pt" and "fibre" insert --melt spun--
line 56, change "Example 5" to --Example 8--

Column 6, Examples 9 and 10, change "5 Pd/5 Rh/Pt" to --5% Pd/5% Rh/Pt--
line 24, change "agglomerate" to --agglomerates--

Signed and Sealed this

Thirteenth Day of March 1984

[SEAL]

Attest:

GERALD J. MOSSINGHOFF

*Attesting Officer*      *Commissioner of Patents and Trademarks*